United States Patent [19]

Rosenberg et al.

[11] B 3,914,717

[45] Oct. 21, 1975

[54] SURFACE WAVE TUBULAR ACOUSTIC DELAY LINE

[75] Inventors: Robert L. Rosenberg, Fair Haven; Ronald Vernon Schmidt, Matawan, both of N.J.

[73] Assignee: Bell Telephone Laboratories, Incorporated, Murray Hill, N.J.

[22] Filed: Oct. 26, 1973

[21] Appl. No.: 410,168

[44] Published under the Trial Voluntary Protest Program on January 28, 1975 as document no. B 410,168.

[52] U.S. Cl. .................... 333/30 R; 310/8.3; 333/72

[51] Int. Cl.[2] ........................ H03H 9/26; H03H 9/30; H01L 41/04; H01L 41/10

[58] Field of Search ........... 333/30 R, 30 M, 71, 72; 310/8.3, 8.4, 8.5, 8.6, 9.4, 9.6, 9.7, 9.8

[56] References Cited

UNITED STATES PATENTS

| | | | |
|---|---|---|---|
| 3,605,043 | 9/1971 | Bienvenu et al. | 333/30 R |
| 3,609,602 | 9/1971 | Devries et al. | 333/72 |
| 3,736,532 | 5/1973 | Armenakas | 333/30 R |

FOREIGN PATENTS OR APPLICATIONS

| | | | |
|---|---|---|---|
| 1,197,860 | 7/1970 | United Kingdom | 333/30 R |

OTHER PUBLICATIONS

Biot, "Propagation of Elastic Waves in a Cylindrical Bore Containing a Fluid," in Journal of Applied Physics, Vol. 23, No. 9, Sept. 1952, pp. 997–1001.

*Primary Examiner*—James W. Lawrence
*Assistant Examiner*—Marvin Nussbaum
*Attorney, Agent, or Firm*—John J. Torrente

[57] ABSTRACT

A surface wave acoustic delay line comprising an elastic or acoustic member of finite length having an outer closed surface and an inner closed surface. The latter inner closed surface defines an orifice or aperture extending through the length of the member and provides a means for guiding an introduced signal through the line via a surface wave which propagates thereon at a substantially constant phase velocity for all frequencies of the introduced signal. By sufficiently removing the outer surface from the inner surface, the aforesaid surface wave is found to remain confined to such inner surface over the entire length L thereof. A constant delay over the line length is thus realized without any significant signal loss.

16 Claims, 10 Drawing Figures

SURFACE WAVE TUBULAR ACOUSTIC DELAY LINE

This invention relates to acoustic delay lines and, in particular, to surface wave acoustic delay lines which provide a substantially constant delay over a given band of frequencies.

BACKGROUND OF THE INVENTION

It is well known to employ materials having elastic or acoustic properties as a means for providing a delay. In many applications moreover, it is required that the delay provided by the aforesaid so-called "acoustic delay lines" be constant over a given frequency band. For an acoustic delay line to achieve such a constant delay, however, it must exhibit substantially nondispersive properties, i.e., it must propagate different frequencies at the same phase velocity.

One type of acoustic delay line exhibiting such non-dispersive properties is the so-called surface wave acoustic delay line. The principles of operation of this type of delay line are well known and have been discussed in numerous journals (See e.g., R. M. White and F. W. Voltmer, "Direct Piezoelectric Coupling to Surface Elastic Waves," *Applied Physics Letters*, Vol. 7, pp. 134–316, December 1965). Briefly, in such delay lines, the acoustic medium comprising the line is excited so that acoustic waves are generated which tend to propagate through or deform the medium in a manner analogous to that of a Rayleigh wave. Since the latter wave is defined as a wave which deforms the region of a medium substantially near its surface (i.e., a wave which propagates with its energy confined essentially to within an acoustic wavelength of the medium surface), the generated acoustic waves will similarly propagate on the surface of the acoustic medium of the line. Such a delay line will thus transmit introduced signals via waves confined substantially to its surface.

As above-indicated, since the aforesaid surface wave acoustic delay line has non-dispersive properties, such a delay line can be employed to provide a constant delay over a given band of frequencies. When employed for such a purpose, however, certain problems are encountered which detract from the ability of the line to operate as constant delay device. In particular, since the propagating acoustic waves propagate on the surface of the delay line medium, the waves are subject to any acoustic disturbances which might arise in the outside environment. The line must thus be provided with an additional shielding structure to ward off these possibly detrimental outside disturbances. Moreover, since the surface on which the waves propagate is typically a flat planar surface, the propagating surface wave is subject to diffraction effects which tend to spread out or diverge the wavefront. If the delay line is of an appreciable length, which is often the case, such divergence of the wavefront of the wave will result in significant energy loss and spurious signals, thus causing unsatisfactory operation of the line.

It is thus a primary object of the present invention to provide a non-dispersive surface wave acoustic delay line which does not suffer from the aforesaid disadvantages, i.e., which is not subject to outside disturbance of diffraction effects.

SUMMARY OF THE INVENTION

In accordance with the principles of the present invention, the above and other objectives are accomplished by employing a delay line which is so structured as to support the propagation of an acoustic surface wave along a closed inner surface which acts as a guide for the surface wave. More particularly, the present delay line comprises an elastic or acoustic member of finite length having an outer closed surface and an inner closed surface. The latter inner closed surface defines an orifice or aperture of length L extending through the member and provides a means for guiding an introduced signal through the line via a surface wave which propagates thereon at a substantially constant phase velocity for all frequencies of the introduced signal. By sufficiently removing the outer surface from the inner surface, moreover, the aforesaid surface wave is found to remain confined to such inner surface over the entire length L thereof. A constant delay over the line length L is thus realized without any significant signal loss due to energy transfer to the outer surface. Additionally, since the guiding surface is an inner closed surface, wave propagation is no longer subject to diffraction effects nor to outside disturbances.

In one particular embodiment of the invention, the inner and outer surface of the delay line member are circularly cylindrical in shape and have collinear axes which are parallel to the length dimension of the member. Thus, in this embodiment, the delay line takes the form of a hollow cylindrical member or an elongated tubular or capillary like member. For this type of line, it has been found that by appropriately proportioning the radius of the orifice extending through the member (the radius of the inner cylindrical surface) and the thickness of the member (the difference between the outer and inner cylindrical surface radii) relative to the lowest frequency (longest wavelength) in the band to be transmitted that non-dispersive propagation of a surface wave along the entire length of the inner surface over the frequency band results.

Also, another aspect of the present invention involves various arrangements for applying signals to and extracting signals from the aforesaid delay line.

DESCRIPTION OF THE DRAWING

A clearer understanding of the above-mentioned objectives and features of the present invention can be obtained by reference to the following detailed description taken in conjunction with the accompanying drawings in which.

DETAILED DESCRIPTION

Figure 1:
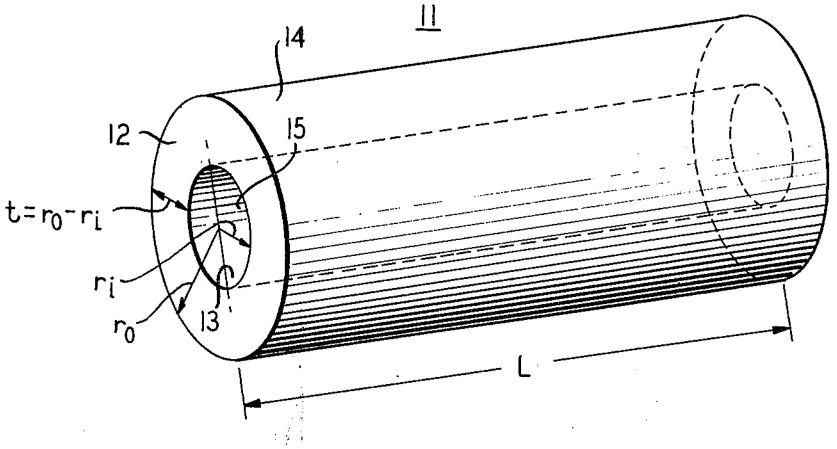
FIG. 1 shows a delay line in accordance with the principles of the present invention.

FIG. 1 shows an acoustic delay line 11 in accordance with the principles of the present invention. More particularly, delay line 11 comprises a member 12 which is formed from a homogeneous elastic material or medium such as, for example, fused silica. Member 12 has an outer closed surface 14 and an inner closed surface 13, the latter inner surface defining an orifice 15 which extends through the member along its length L. As shown, inner and outer surfaces 13 and 14 are cylindrical surfaces having collinear axes which extend parallel to the aforesaid length L of member 12. More particularly, inner surface 13 defines a cylindrical surface of the radius $r_i$ and length L, while outer surface 14 defines a cylindrical surface equal in length to and concentric with the inner cylindrical surface 13, but of a radius $r_o$ greater than the inner surface radius $r_i$. As depicted, therefore, delay line 11 is in the form of hollow cylindrical member having a length L and a constant thickness $t$ equal to the difference between the outer and inner cylindrical surface radii (i.e., equal to $r_o - r_i$).

It is assumed that delay line 11 is to provide a constant delay over a frequency band $\Delta f$. The latter band has a lower frequency $f_L$ whose corresponding wavelength $\lambda_L$ and phase velocity $v_L$ within member 12 satisfy the relationship $v_L/\lambda_L = f_L$. As will be seen, in the region of non-dispersive operation of line 11, the wave velocity $v_L$ will be at substantially the Rayleigh wave phase velocity $v_r$ for the medium comprising member 12.

Figure 2:
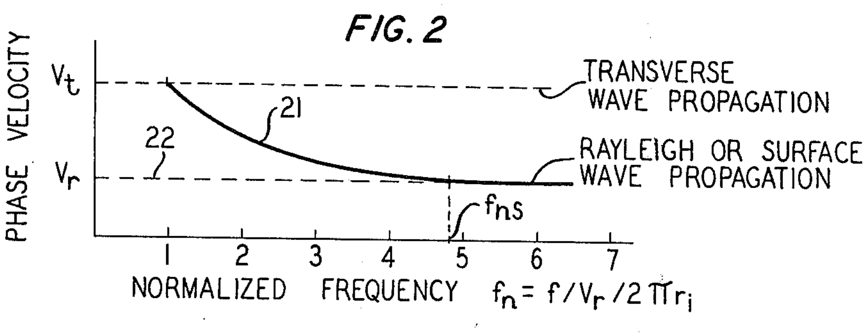
FIG. 2, included for purposes of explanation, shows the phase velocity versus normalized frequency characteristic for the delay line of FIG. 1.
Figure 3:
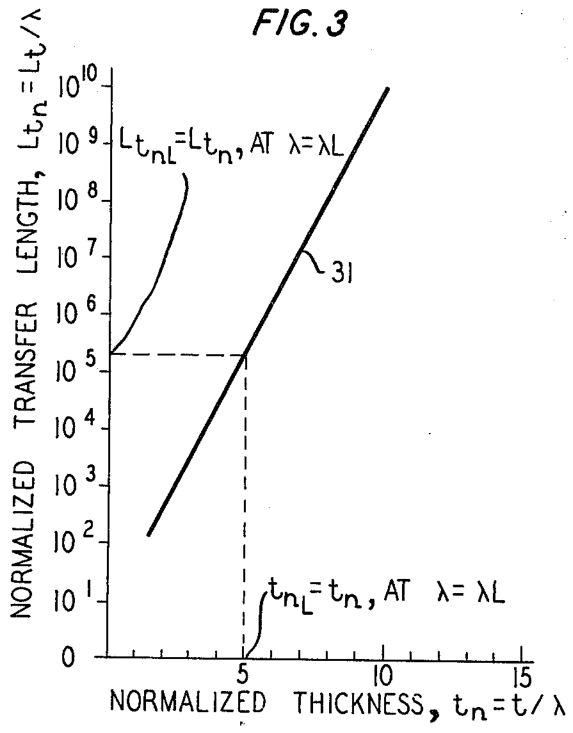
FIG. 3, also included for purposes of explanation, illustrates the energy transfer characteristic for the delay line of FIG. 1.

The principles governing the operation of delay line 11 can be best understood by observing the characteristics illustrated in FIGS. 2 and 3. More particularly, FIG. 2 shows a representative dispersion characteristic, i.e., a phase velocity versus frequency characteristic, 21 for line 11. As indicated, the frequencies plotted on the frequency scale of characteristic 21 have been normalized with respect to the frequency parameter $v_r/2\pi r_i$. Additionally, as also indicated, two phase velocities of interest $v_r$ and $v_t$ have been noted on the phase velocity scale of the characteristic. The phase velocity $v_r$, as above-mentioned, is the Rayleigh wave phase velocity for the medium comprising member 12 and is indicative of surface wave propagation on a flat surface of such medium. The phase velocity $v_t$ on the other hand, is the transverse wave phase velocity for the aforesaid medium and is indicative of wave propagation in the bulk thereof. In general, once a particular medium is specified for member 12 the wave velocities $v_r$ and $v_t$ can be readily calculated in a wellknown manner from the elastic properties thereof.

Characteristic 21 gives insight into two important properties regarding acoustic wave propagation in member 12. First, since the characteristic indicates phase velocities can be realized which are less than the transverse wave phase velocity $v_t$, it is apparent that the member can be excited to propagate surface waves. Secondly, since the characteristic is substantially asymptotic to the Rayleigh wave phase velocity $v_r$ (dotted line 22) above the normalized frequency $f_{ns}$, it is also apparent that surface wave propagation at essentially the phase velocity $v_r$ can be realized for a band of frequencies, if the normalized frequency corresponding to the lowest frequency in the band is greater than the frequency $f_{ns}$.

In accordance with the above observations, therefore, it is seen that member 12 can propagate the band of frequencies $\Delta f$ via a surface wave on surface 13 at the phase velocity $v_r$, if the normalized frequency $f_{nL}$ corresponding to the lowest frequency $f_L$ in the band is greater than the normalized frequency $f_{ns}$. Thus $$f_{nL} = f_L/v_r/2\pi r_i > f_{ns} \quad (1)$$

More particularly, equation (1) will be satisfied and hence the desired propagation will occur, if the radius $r_i$ of orifice 15 (of inner cylindrical surface 13) satisfies the relationship $$r_i > v_r f_{ns}/2\pi f_L \quad (2)$$

Substituting for the frequency $f_L$ its equivalent expression given above, equation (2) can be rewritten as $$r_i > f_{ns} v_r \lambda_L/2\pi v_L \quad (3)$$

Moreover, noting that for the condition of equation (3) the phase velocities $v_r$ and $v_L$ are approximately equal, equation (3) reduces to $$r_i > f_{ns}/2\pi\lambda_L \quad (4)$$

It should be noted that the particular normalized frequency $f_{ns}$ which governs a particular application of line 11 will be dependent upon the amount of dispersion which can be tolerated in such application. Generally speaking, however, as is evident from characteristic 21, the lesser the amount of dispersion permissible, the further down on the asymptote $f_{ns}$ must be (i.e., the larger it must be) and hence, the larger will be the value of $r_i$ given by equations 2 through 4.

While selecting the radius $r_i$ so as to satisfy equation 2, 3 or 4 will thus result in initiating the transmission of the frequency band $\Delta f$ through delay line 11 via a surface wave which propagates on the inner surface 13 at a substantially constant phase velocity $v_r$, whether the generated surface wave will remain confined to such surface and thus be guided thereby over the entire length L of the line will depend on a second dimensional parameter of member 12. This is made clear in FIG. 3 which shows the energy transfer characteristic 31 for member 12 when equations 2, 3 or 4 are satisfied. More particularly, characteristic 31 is a plot of the normalized transfer length $L_{t_n} = (L_t/\lambda_n)$ versus normalized thickness $t_n = (t/\Delta)$ for member 12, where $\lambda$ is the wavelength of a surface wave which propagates initially on inner surface 13 of member 12 and $L_t$ is the length of member 12 over which there is a complete transfer of such surface wave from inner surface 13 to outer surface 14 of the member.

As can be seen from characteristic 31, the smaller the normalized thickness of member 12, the shorter will be the normalized length of the member before a surface wave generated on its inner surface 13 totally transfers to its outer surface 14. Since smaller normalized thicknesses correspond to longer wavelengths, it readily follows that waves of longer wavelengths will be transferred from the former to the latter surface in shorter lengths of member 12 than waves of shorter wavelengths. As a result, by assuring that the longest wavelength to be propagated through member 12 has a corresponding normalized thickness whose associated normalized transfer length is substantially larger than the actual normalized length of the line at such wavelength, all wavelengths equal to and shorter than the longest wavelength will pass through the line with negligible transfer from surface 13 to surface 14.

In accordance with the present invention, therefore, the thickness $t$ of line 11 is selected so that its corresponding normalized thickness $t_{n_L}$ at the longest wavelength $\lambda_L$ in the band $\Delta f$ results in a transfer length $L_{t_{n_L}}$ which is much greater than the normalized length $(L/\lambda_L)$ of line 11 at such wavelength. With this value for the thickness of the line, the surface wave generated on the inner surface 13 thereof will propagate through the line with negligible transfer of its energy to the outer surface over the entire band $\Delta f$.

The particular value of $t$ selected for line 11 for any given application will of course depend upon the amount of energy transfer that can be tolerated. In a typical case, however, negligible energy transfer will occur over the line length L if $$L_{t_{nL}} > 100\ L/\lambda_L \quad (5)$$

Assuming a $L/\lambda_L$ ratio of approximately 3,000, this means that $L_{t_{nL}} > 3\times10^5$ and from characteristic 31 that $t_{n_L} > 5.0$ which, in turn, requires $t > 5.0\ \lambda_L$.

Figures 4, 5:
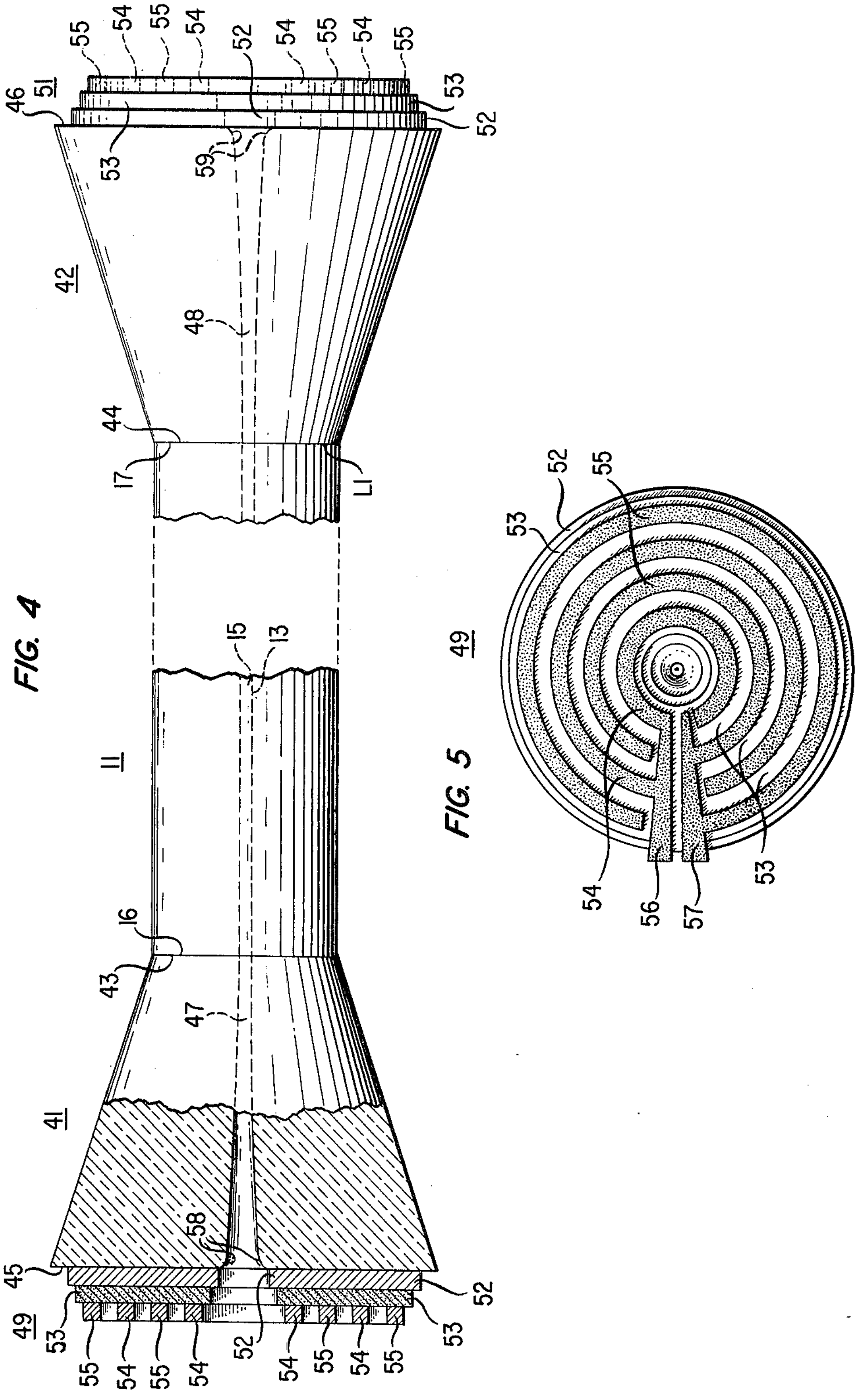
FIGS. 4 and 5 show the delay line of FIG. 1 modified to include particular input and output transducer structures.

FIG. 4 shows a second embodiment of the present invention wherein the acoustic delay line 11 of FIG. 1 is provided with an input means 41 for introducing signals therein and a similarly structured output means 42 for extracting signals therefrom. As illustrated, input and output means 41 and 42 are similarly shaped truncated conical members whose truncated ends 43 and 44 have radii equivalent to that of the outer cylindrical surface of line 11 and whose base ends 45 and 46 have radii larger than that of the aforesaid outer surface. Moreover, each of the latter members has an orifice of increasing circular cross section which runs along its length from its truncated end to its base end. More particularly, the orifices 47 and 48 running through members 41 and 42, respectively, have cross sections at their respective truncated ends equal to that of the cross section of the orifice 15 defined by the inner cylindrical surface 13 of line 11 and cross sections at their respective base end larger than that of the orifice defined by such surface.

As indicated, input and output members 41 and 42 are arranged with their truncated ends opposite their respective ends 16 and 17 of line 11 and so that their orifices are aligned with orifice 15 of the line.

The members 41 and 42, if they are separately fabricated from line 11, can be attached or affixed thereto in the manner described with a suitable substance, such as e.g., epoxy, to form the integral structure of FIG. 1. On the other hand, such members may be formed together with line 11 by drawing or pulling of a tubular member having an outer radius equal to that of the end portions of the members.

Attached to the respective end surfaces of members 41 and 42 are identical surface wave transducer structures 49 and 51, respectively. The latter two transducer structures have been illustrated in FIG. 4 in an exaggerated scale in order to promote clarity in their description given hereinbelow. A front view of one of these structures, structure 49, also in an exaggerated scale is shown in FIG. 5. As illustrated, each of the transducer structures 49 and 51 comprises a bottom portion including an annular metallic layer 52, a middle portion comprising a piezoelectric annular layer 53, and top portion including a first set of concentric annular metallic layers 54, a second set of concentric annular metallic layers 55, which are interleaved between annular layers of the first set, and first and second metallic strips 56 and 57 interconnecting respectively the aforesaid first and second sets of concentric annular layers. In a typical case, each of the transducer structures would have a total thickness, as measured between its bottom and top portions, of less than an acoustic wavelength.

The transducer structures 49 and 51 are modifications of well-known interdigital type surface wave transducer devices. (For a discussion of such devices see e.g., Ritsuo Inaba, Koji Kajimura, and Nobuo Mikoshiba "Thickness Dependence of Conversion Efficiency of ZnS Film Transducers for Elastic Surface Waves," *Journal of Applied Physics.*, June 1973, pp2495–2503, or R. Wagers, G. Kino, P. Galle, and D. Winslow, "ZnO Acoustic Transducers Utilizing Crystalline Gold Substrata," *Proceedings* 1972 *Ultrasonics Symposium*, pp 194–197). In operation, an electrical signal applied across metal strips 56 and 57 of transducer 49 will cause the transducer to generate an acoustic signal which is in the form of a surface wave on the base surface 45 of input member 41. Because of the annular concentric (ring-type) configuration of the first and second sets of electrodes of the transducer, however, the generated wave is the generated wave is focused or directed thereby toward the central portion of the surface and, thus, toward the orifice 47 which runs through member 41. By making the radius of curvature of the transition region 58 between end surface 45 and orifice 47 substantially greater than a wavelength, the generated wave will couple, with a minimum of loss, from the surface 45 to the surface of the orifice and from there onto the inner cylindrical surface 13 of line 11.

The operation of the transducer structure 51 is the inverse of the aforesaid operation of transducer 49. In particular, the surface wave which is propagating on the inner surface 13 of line 11 is coupled therefrom onto the surface of the orifice 48 which runs through output member 42. As in the previous case, the radius of curvature of the transition region 59 between the surface of the latter orifice and the base end 46 of member 42 is made substantially greater than a wavelength and, thus, the surface wave propagating on the orifice surface is coupled therefrom onto the base surface 46 with a minimum of loss. The wave propagates radially outward from the orifice surface causing acoustic excitation of the transducer structure 51. The latter structure, in turn, responds to such excitation by generating an electrical signal corresponding to the signal carried via the acoustic wave.

Figure 6:
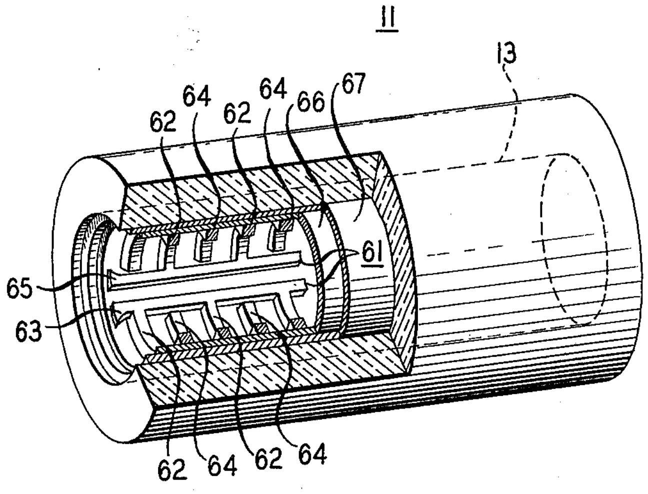
FIGS. 6, 7 and 8 illustrate various other transducer structures which can be employed with the delay line of FIG. 1.

FIG. 6 illustrates another interdigital ring-type transducer arrangement which can be employed to couple signals into and out of delay line 11 of FIG. 1. Only the transducer configuration at the input end of line 11 is actually illustrated, however, since the configuration at the output end of the line is exactly the same. As shown, transducer configuration 61 is disposed on the inner cylindrical guiding surface 13 of delay line 11 so that it acts to launch an acoustic surface wave directly onto such surface. More particularly, transducer 61 is a three layered structure whose top layer comprises a first set of parallel band-shaped portions 62 which are connected to a first common metallic strip 63 and a second set of parallel metallic band-shaped portions 64, interleaved between the first set of bands, which are coupled to a second common metallic strip 65. Disposed immediately beneath the aforesaid top layer of transducer 61 is a middle layer which comprises piezoelectric band-shaped portion 66. The latter band-shaped portion, in turn, is situate upon the bottom layer of transducer 61, the latter bottom layer being applied directly onto the surface 13 and comprising a metallic portion 67 which is also band-shaped.

As is apparent, the ring-type transducer 61 is similar in configuration to the ring-type interdigital transducers 49 and 51 shown in FIG. 4, except that the bands of transducer 61 are disposed in parallel planes and not concentrically in the same plane as in transducers 49 and 51. As a result, transducer 61 operates to generate acoustic surface waves on surface 13 in an analogous manner as the latter transducers. Due to the band-shaped configuration of metallic portions or fingers 62 and 64, however, and the location of these portions on surface 13, the wave generated by transducer 61 will propagate directly on to the latter surface and be guided thereby.

Figure 7:
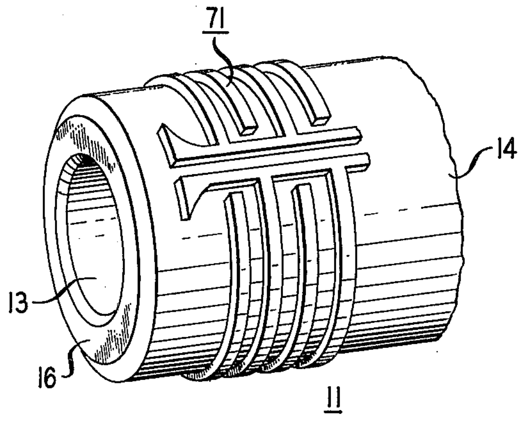

FIG. 7 shows a transducer structure 71 similar to that illustrated in FIG. 6, except that the transducer 71 is disposed on the outside surface 14 rather than the inside surface 13 of delay line 11. Operation with the latter transducer disposed in this manner, however, requires that the transition regions between the end flat surface 16 of the line 11 and the cylindrical surfaces 13 and 14 be rounded slightly, as shown, so that the generated surface wave readily couples from the outer surface 14 to the inner surface 13.

Figure 8:
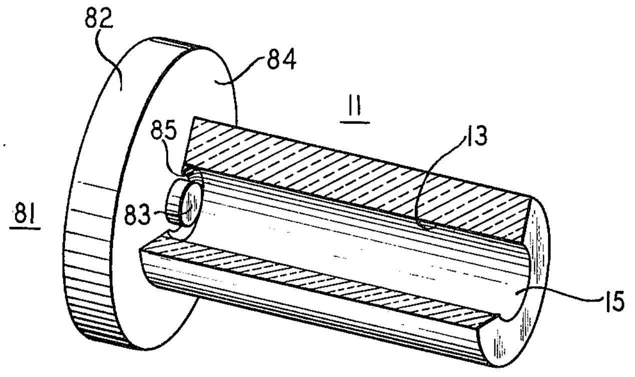

FIG. 8 shows still another transducer arrangement which can be employed with delay line 11 of FIG. 1. In this case, transducer 81 comprises a substrate of piezoelectric material 82 upon which is situated a ring-type inter-digital electrode structure 83 of the type depicted by the top portions of the transducers 49 and 51 in FIGS. 4 and 5. The substrate 82 is affixed to the end of line 11 by bonding with a suitable material, such as, for example, epoxy, and is disposed such that the electrode structure 83 lies within the orifice 15 defined by the inner surface 13 of the line. A smooth transition between the substrate surface 84, upon which the electrodes 83 lie, and the inner surface 13 is provided by including a cast filet 85 in the region therebetween, the latter filet having a radius of curvature greater than a wavelength and typically being formed from epoxy.

Figure 9:
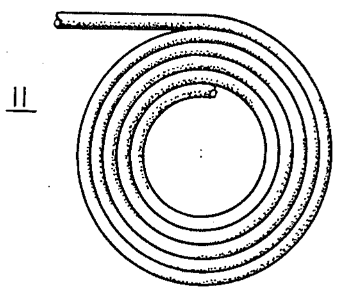
FIGS. 9 and 10 show two coil like configurations of the delay line of FIG. 1.
Figure 10:
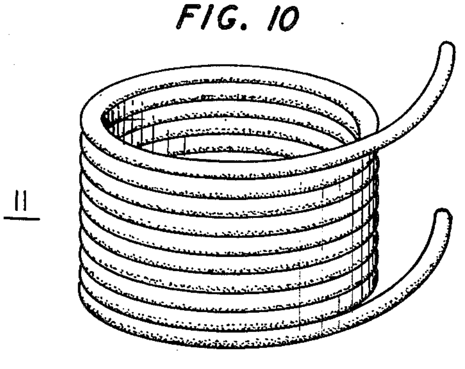

FIGS. 9 and 10 illustrate configurations of line 11 which permit a long length of line 11 to be compressed within a relatively small space. More particularly, FIG. 9 illustrates line 11 arranged in a spiral coil-like configuration, while FIG. 10 illustrates a helical coil-like configuration of the line. As is apparent, both these configurations permit the actual length of the line to be substantially larger than the linear space it occupies. Moreover, since surface wave propagation through the line is on the inner surface thereof, maintaining isolation between successive turns in each configuration is of no concern. Such turns thus can be in contact with one another, as shown, without disturbing the line performance.

In all cases, it is understood that the abovedescribed arrangements are merely illustrative of some of the possible specific embodiments which may be applications of the present invention. Numerous and valid other arrangements can be readily devised in accordance with these principles without departing from the spirit and scope of the invention. For example, instead of employing an isotropic medium, such as fused silica, for the medium comprising member 12 of line 11 of FIG. 1, an anisotropic medium, such as cadmium sulfide, could also have been employed. In such a case, the c-axis of the anisotropic material should be in a direction parallel to that of the axis of the orifice 15 defined by surface 13.

What is claimed is:

1. An acoustic delay line for providing a substantially constant delay to an applied signal having a frequency band $\Delta f$ comprising:

an elastic member having outer and inner closed surfaces of finite length, said inner surface defining an orifice extending through said member and providing a means for guiding said signal through said member via an acoustic surface wave which propagates on said inner surface along the length thereof, said outer surface being sufficiently far removed from said inner surface so as to prevent any substantial transfer of said surface wave to said outer surface during propagation of said wave along the length of said inner surface.

2. A delay line in accordance with claim 1 in which said member is comprised of a homogeneous elastic medium.

3. A delay line in accordance with claim 1 which includes, in addition, transducer means for applying said signal to and extracting said signal from said elastic member.

4. A delay line in accordance with claim 1 in which said elastic member is in the form of a hollow cylinder.

5. A delay line in accordance with claim 1 in which said acoustic surface wave propagates on said inner surface at a substantially constant phase velocity for all frequencies in said band.

6. A delay line in accordance with claim 5 in which said inner surface defines a cylindrical surface of radius $r_i$ and length L and said outer surface defines a cylindrical surface, concentric with said inner surface, of length L and radius $r_O$, the radius $r_O$ being greater than the radius $r_i$.

7. A delay line in accordance with claim 6 in which the lowest frequency in said band produces acoustic wave propagation at a wavelength $\lambda_L$ in said member and in which said inner radius $r_i$ is proportioned relative to said wavelength $\lambda_L$ such that said surface wave on said inner surface propagates at substantially a constant phase velocity for all frequencies in said band and said length L is proportioned relative to said wavelength $\lambda_L$ such that said surface wave remains substantially confined to said inner surface over the length L thereof.

8. A delay line in accordance with claim 6 in which said delay line is arranged in a coil like configuration having successive turns in contact with one another.

9. A delay line in accordance with claim 6 which includes, in addition, first and second transducer means disposed on said inner surface at opposite ends thereof.

10. A delay line in accordance with claim 6 which includes, in addition, first and second transducer means disposed on said outer surface at opposite ends thereof.

11. A delay line in accordance with claim 6 in which the surfaces at the beginning and end of the orifice defined by said inner surface provide input and output end surfaces, respectively, for said line.

12. A delay line in accordance with claim 11 which includes input and output sections which are coupled to said input and output end surfaces, respectively, each of said sections comprising:

an elastic body having a signal end surface, a line end surface and an orifice running therethrough between said signal and line surfaces whose cross section at said line surface is equal to that of the orifice defined by said inner surface, said line end surface of said body being in contact with the respective end surface of said line associated therewith and said orifice within said body being aligned with the orifice defined by said inner surface;

and transducer means disposed on said signal end for providing coupling between acoustical and electrical energy.

13. A delay line in accordance with claim 11 which includes, in addition, input and output means affixed to said input and output end surfaces, respectively, said input and output means each including:

a piezoelectric substrate portion which is affixed to the end surface of the line associated with the respective means;

a ring-type electrode structure arranged on the surface of said substrate which is in contact with said inner surface such that said electrode structure lies within said inner surface;

and means disposed between said contact surface and said inner surface to provide a gradual transition therebetween.

14. A delay line in accordance with claim 12 in which said transducer means comprises:

a first annular metallic layer, said first layer being concentric with said orifice in said body;

an annular piezoelectric layer, said piezoelectric layer being concentric with said first layer; and a second metallic layer, said second layer being concentric with said first and comprising:

a first plurality of concentric annular metallic portions;

a second plurality of annular metallic portions interleaved between said first plurality;

a first metallic strip connected to said first plurality; and a second metallic strip connected to said second plurality.

15. An acoustic delay line comprising:

a member comprised of an elastic medium, said member having inner and outer closed surfaces of finite length, said inner closed surface defining an orifice extending through said member whose presence causes the phase velocity versus frequency characteristic of said member to exist at phase velocities below the transverse wave phase velocity of said medium thereby enabling surface wave propagation on said inner surface along the length thereof, said outer surface being sufficiently removed from said inner surface to prevent surface wave energy propagating along the length of said inner surface from being transferred to said outer surface.

16. An acoustic delay line in accordance with claim 15 in which said phase velocity versus frequency characteristic is substantially asymptotic to the Rayleigh wave phase velocity for said medium for frequencies above a preselected frequency, thereby permitting surface wave propagation on said inner surface at substantially said Rayleigh wave phase velocity for said frequencies above said preselected frequency.

* * * * *

UNITED STATES PATENT AND TRADEMARK OFFICE

CERTIFICATE OF CORRECTION

PATENT NO. : 3,914,717

DATED : October 21, 1975

INVENTOR(S) : Robert L. Rosenberg
Ronald V. Schmidt

It is certified that error appears in the above-identified patent and that said Letters Patent are hereby corrected as shown below:

Column 1, line 64, at the beginning of the line, "of" should read --or--.

Column 4, line 25 that part of Equation (4) after "$r_i$ > " should read --$f_{ns}\lambda_L/2\pi$--;

Column 4, line 50, after the word "thickness", "$t_n = (t/\Delta)$" should be deleted and replaced by --$t_n = (t/\lambda)$--.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*